(12) United States Patent
Priyadarshi et al.

(10) Patent No.: US 10,831,254 B2
(45) Date of Patent: Nov. 10, 2020

(54) ALLOCATING POWER BETWEEN MULTIPLE CENTRAL PROCESSING UNITS (CPUS) IN A MULTI-CPU PROCESSOR BASED ON TOTAL CURRENT AVAILABILITY AND INDIVIDUAL CPU QUALITY-OF-SERVICE (QOS) REQUIREMENTS

(71) Applicant: QUALCOMM Incorporated, San Diego, CA (US)

(72) Inventors: Shivam Priyadarshi, Morrisville, NC (US); SeyedMajid Zahedi, Durham, NC (US); Derek Robert Hower, Durham, NC (US); Carl Alan Waldspurger, Palo Alto, CA (US); Jeffrey Todd Bridges, Raleigh, NC (US); Sanjay Bhikhubhai Patel, Cary, NC (US); Gabriel Martel Tarr, Durham, NC (US); Chih Kang Lin, Raleigh, NC (US); Ryan Donovan Wells, Raleigh, NC (US); Harold Wade Cain, III, Raleigh, NC (US)

(73) Assignee: Qualcomm Incorporated, San Diego, CA (US)

( * ) Notice: Subject to any disclaimer, the term of this patent is extended or adjusted under 35 U.S.C. 154(b) by 118 days.

(21) Appl. No.: 16/129,417

(22) Filed: Sep. 12, 2018

(65) Prior Publication Data

US 2019/0086982 A1 Mar. 21, 2019

Related U.S. Application Data

(60) Provisional application No. 62/559,159, filed on Sep. 15, 2017.

(51) Int. Cl.
*G06F 1/00* (2006.01)
*G06F 1/324* (2019.01)
(Continued)

(52) U.S. Cl.
CPC ............ *G06F 1/324* (2013.01); *G06F 1/3206* (2013.01); *G06F 1/3296* (2013.01)

(58) Field of Classification Search
None
See application file for complete search history.

(56) References Cited

U.S. PATENT DOCUMENTS

2008/0077817 A1 3/2008 Brundridge et al.
2012/0078430 A1 3/2012 Fan et al.
(Continued)

OTHER PUBLICATIONS

International Search Report and Written Opinion for International Patent Application No. PCT/US2018/050805, dated Dec. 20, 2018, 17 pages.
(Continued)

*Primary Examiner* — Nitin C Patel
(74) *Attorney, Agent, or Firm* — Withrow & Terranova, PLLC

(57) ABSTRACT

Allocating power between multiple central processing units (CPUs) in a multi-CPU processor based on total current availability and individual CPU quality-of-service (QoS) requirements is disclosed. Current from a power rail is allocated to CPUs by a global current manger (GCM) circuit related to performance criteria set by CPUs. The CPUs can request increased current allocation from the GCM circuit, such as in response to executing a higher performance task. If the increased current allocation request keeps total current on the power rail within its maximum rail current limit, the GCM circuit approves the request to allow the CPU increased current allocation. This can allow CPUs executing higher performance tasks to have a larger current allocation than CPUs executing lower performance tasks without the maximum rail current limit being exceeded, and without having to necessarily lower voltage of the power rail, which could unnecessarily lower performance of all CPUs.

26 Claims, 8 Drawing Sheets

(51) Int. Cl.
  *G06F 1/3206* (2019.01)
  *G06F 1/3296* (2019.01)

(56) References Cited

U.S. PATENT DOCUMENTS

2015/0309551 A1 10/2015 Yeager
2016/0011914 A1 1/2016 Bohn et al.

OTHER PUBLICATIONS

International Preliminary Report on Patentability for International Patent Application No. PCT/US2018/050805, dated Mar. 26, 2020, 11 pages.

ALLOCATING POWER BETWEEN MULTIPLE CENTRAL PROCESSING UNITS (CPUS) IN A MULTI-CPU PROCESSOR BASED ON TOTAL CURRENT AVAILABILITY AND INDIVIDUAL CPU QUALITY-OF-SERVICE (QOS) REQUIREMENTS

PRIORITY

The present application claims priority under 35 U.S.C. § 119(e) to U.S. Provisional Patent Application Ser. No. 62/559,159 filed on Sep. 15, 2017 and entitled "ALLOCATING POWER BETWEEN MULTIPLE CENTRAL PROCESSING UNITS (CPUS) IN A MULTI-CPU PROCESSOR BASED ON TOTAL CURRENT AVAILABILITY AND INDIVIDUAL CPU QUALITY-OF-SERVICE (QoS) REQUIREMENTS," the contents of which is incorporated herein by reference in its entirety.

BACKGROUND

I. Field of the Disclosure

The technology of the disclosure relates generally to power management of circuits in an integrated circuit (IC) chip, and more particularly to power management of a processor-based system in an IC chip under current-constrained conditions.

II. Background

Portable computing devices (PCDs) are becoming necessities for people on personal and professional levels. These devices may include cellular telephones, portable digital assistants ("PDAs"), portable game consoles, palmtop computers, and other portable electronic devices. PCDs typically include an integrated circuit (IC) that includes a processing unit, such as a central processing unit ("CPU") or graphics processing unit ("GPU"), that is a large source of power consumption. Further, these processing units may include multiple CPU or processor cores for enhanced performance. Power conservation may be particularly important in these PCDs, especially if battery-powered. Increased power consumption undesirably results in faster battery drainage and shorter battery life.

In this regard, processing units in ICs may be constrained to a specified average power consumption to conserve power. In this regard, ICs that include a processing unit also conventionally include a power management system that is able to throttle the operating voltage of the processing unit to conserve power according to the active power equation $P=CV^2f$, where 'P' is power, 'C' is capacitance, 'V' is operating voltage, and 'f' is operating frequency. However, reducing operating voltage results in lower circuit performance (i.e., speed) and may negatively impact the user experience as measured in user perceived quality of service ("QoS"). Further, a processing unit may include a dynamic clock voltage scaling (DCVS) circuit to control clock frequency and voltage level settings by predicting optimal clock frequency and voltage settings for a processor and/or other synchronously clocked components based on performance demands. In this manner, DCVS circuits may optimize power consumption required for a demanded performance target. However, again, lowering operating frequency and/or operating voltage of the processing unit also lowers speed performance, which may also negatively impact QoS.

Another unique aspect of PCDs is that they typically do not have active cooling devices, like fans, which are often found in larger computing devices such as laptop and desktop computers. Instead of using fans, PCDs may rely on the spatial arrangement of electronic packaging so that two or more active and heat-producing components are not positioned proximally to one another. Many PCDs also rely on passive cooling devices, such as heat sinks, to manage thermal energy among electronic components which collectively form a respective PCD. The reality is that PCDs are typically limited in size, and therefore, room for components within a PCD often comes at a premium. As such, there rarely is enough space within a PCD for engineers and designers to mitigate thermal degradation or failure of processing components by using clever spatial arrangements or strategic placement of passive cooling components. Thus, it is common for PCDs to have a thermal budget constraint. Power management systems in ICs in PCDs control power based on thermal budget constraints by relying on various temperature sensors embedded on the IC chip and elsewhere to monitor the dissipation of thermal energy. The power management system uses these power measurements to trigger application of thermal power management techniques that adjust workload allocations, processing speeds, etc. to reduce thermal energy generation. For example, the power management system may be configured to lower the operating voltage of a power rail supplying power to processing units to reduce thermal energy generation. However, lowering the operating voltage for thermal energy generation may also be at the expense of QoS due to a slowed processing performance from a reduced operating voltage.

ICs may also have current constraints that are managed by power management systems. For example, metal lines in an IC and/or external pins to the IC chip may have current carrying limitations. Thus, if the current draw by the processing units in the IC exceeds these current carrying limitations, the power management system may lower the operating voltage for the processing units at the expense of reduced performance and QoS.

Conventionally, power management systems under such power consumption, thermal, and/or current constraints reduce power rail voltage to reduce operating voltage of processing units. For example, FIG. 1 is an illustration of an electronic device 100 that includes an IC chip 102 that includes a multi-CPU processor 104 comprising a plurality of CPUs 106(0)-106(N). The CPUs 106(0)-106(N) are each coupled to a power rail 108 to receive power for operation. The power rail 108 receives power from an off-chip regulator 110 that is included as part of a power management system 112 on a printed circuit board (PCB) 114 along with the multi-CPU processor 104. A power supply 116, such as a battery, may be included in the electronic device 100 to supply power to the off-chip regulator 110. The off-chip regulator 110 then regulates voltage on the power rail 108 based on a maximum current limit for the power rail 108. The off-chip regulator 110 monitors current draw from the CPUs 106(0)-106(N), and can lower a voltage on the power rail 108 to reduce the operating voltage to the CPUs 106(0)-106(N) to reduce the current draw by the CPUs 106(0)-106(N). The CPUs 106(0)-106(N) may be configured to reduce their operating frequency based on the available voltage on the power rail 108.

Reducing the operating voltage can affect the different workloads of the different CPUs running on the power rail voltage differently. For example, FIG. 2 is a graph 200 that illustrates exemplary performance degradation incurred by higher performance workloads 202(0), 202(1) and lower performance memory workloads 204 when they run together in the multi-CPU processor 104 in FIG. 1 in a current-constrained environment as compared to an unconstrained current environment. As shown in FIG. 2, the higher performance workloads 202(0), 202(1) executed in the CPUs 106(0)-106(N) may degrade by a larger percentage under a reduced voltage on the power rail 108 than lower performance memory workloads 202. While it is desired to regulate the current on the power rail 108 from exceeding its maximum current limit, it is also not desired to reduce performance of the CPUs 106(0)-106(N), especially when executing higher performance workloads 202(0), 202(1) whose performance reduction due to limiting current may incur a greater performance degradation, and thus more greatly affect QoS.

SUMMARY OF THE DISCLOSURE

Aspects disclosed herein include allocating power between multiple central processing units (CPUs) in a multi-CPU processor based on total current availability and individual CPU quality-of-service (QoS) requirements. Multiple CPUs are electrically coupled to a common power rail to receive power for operation. Each CPU may have a different current demand on the power rail depending on the tasks being performed and their performance criteria. To avoid the cumulative current demand from each of the CPUs being greater than a maximum rail current limit for the power rail, a global current manager (GCM) circuit is provided. The GCM circuit is configured to limit the total current demand from the power rail from exceeding a maximum rail current limit of the power rail. If the total current demand exceeds the maximum rail current limit, the GCM circuit could lower the voltage level of the power rail to lower the current demand of each of the CPUs. However, some CPUs may be executing higher performance tasks such that lowering their operating voltage would reduce their QoS, whereas other CPUs may be executing lower performance tasks with operating voltage margin where lowering the operating voltage would not affect their QoS.

Thus, to avoid being required to lower the voltage level of the power rail, thus reducing the operating voltage to all of the CPUs equally, the GCM circuit is configured to proportionally allocate current demand for each of the CPUs based on their desired current allocations. In this regard, in exemplary aspects disclosed herein, the GCM circuit is configured to set an initial operating voltage of the power rail (e.g., through a power regulator) based on the initial performance criteria reported by local current manager (LCM) circuits associated with respective CPUs. The GCM circuit sets initial current allocations for the CPUs based on the initial performance criteria reported by the LCM circuits. The LCM circuits are local circuits that are configured to monitor and maintain the current demand of their associated CPUs within their allocated current allocation set by the GCM circuit. As CPUs start executing their workloads based on performance criteria, the LCM circuits can request additional current allocation to the GCM circuit for their associated CPU beyond their allocated current allocation based on their workload activity, such as to avoid reducing QoS. The LCM circuits constrain current demand (e.g., by controlling operating frequency) from their associated CPUs until and if additional current allocation is approved by the GCM circuit. If the increased current allocation requests from the LCM circuits keep the total current demand from the power rail within its maximum rail current limit, the GCM circuit can approve the increased current allocation request and communicate a new current allocation to the LCM circuit associated with the requesting CPU. This allows the requesting LCM circuit to allow its associated CPU to execute a workload with increased performance that requires additional current demand according to the new increased current allocation. If the increased current allocation requests from the LCM circuits do not keep the total current demand from the power rail within its maximum rail current limit, the GCM circuit may allocate current to the CPUs based on their performance criteria. Performance criteria may include relative or absolute CPU performance targets or a relative CPU priority (e.g., weight) as non-limiting examples. The GCM circuit is configured to allocate current to the CPUs proportionally according to their relative performance criteria. The GCM circuit is configured to communicate to the LCM circuits to adjust the operating voltage of their respective CPUs to effectuate the proportional current allocations to the CPUs. The LCM circuit can adjust (i.e., reduce, increase, or maintain) its operating voltage and/or frequency according to the adjusted current allocation. For example, the LCM circuit may communicate to a local voltage regulator to adjust the operating voltage provided to the respective CPU based on the adjusted current allocation.

Thus, in examples disclosed herein, current available from the power rail is allocated by the GCM circuit in proportion to the performance criteria set by the CPUs and their relative priorities with respect to each other. A lower current demand from a CPU with a lower performance criteria and thus lower current allocation demand, allows additional current to be allocated to another CPU with a higher performance criteria and higher current allocation demand, without exceeding a maximum rail current limit. This can allow CPUs executing higher performance tasks to have a larger current allocation than CPUs executing lower performance tasks without the maximum rail current limit being exceeded, and without having to necessarily lower the voltage of the power rail which could unnecessarily lower the performance of all CPUs. However, as a safeguard, if the current allocation requested from all the CPUs exceeds the maximum rail current limit (or after a determined amount of time) even with the individual, proportional current allocations set for each of the CPUs, the GCM circuit can resort to reducing the voltage on the power rail as a secondary effort, thus causing the LCM circuits to force their CPUs to operate at relatively lower frequencies to restrict their current consumption. The LCM circuits can continue to request additional current allocation such that the GCM circuit may adjust the proportional current allocations to the CPUs to try to satisfy the current demand from all CPUs.

In this regard, in one exemplary aspect disclosed herein, a power management system for a multi-CPU processor is provided. The power management system further comprises a plurality of LCM circuits each associated with a CPU among the plurality of CPUs and each communicatively coupled to a GCM circuit. The GCM circuit is configured to receive a current allocation request from a LCM circuit among the plurality of LCM circuits indicating a requested current allocation for its respective CPU, and determine if the requested current allocation from the LCM circuit would cause a total current allocation for the plurality of CPUs to exceed a maximum rail current limit for the power rail. In response to determining that the requested current allocation from the LCM circuit would cause the total current allocation for the plurality of CPUs to exceed the maximum rail current limit for the power rail, the GCM circuit is configured to allocate a current allocation of the total current allocation of the power rail for each of the plurality of CPUs based on a respective performance criteria of the plurality of CPUs. The GCM circuit is further configured to communicate the determined current allocation for each of the plurality of CPUs to the plurality of LCM circuits. Each LCM circuit of the plurality of LCM circuits is configured to receive, from the GCM circuit, the current allocation for its associated CPU set by the GCM circuit, and communicate a current allocation request for additional current allocation for its associated CPU to the GCM circuit. In response to receiving a denial from the GCM circuit for the additional current allocation required for its associated CPU, each LCM circuit is configured to receive, from the GCM circuit, a new current allocation for its associated CPU, adjust an operating frequency of the associated CPU based on the received new current allocation, and instruct a voltage regulator circuit to adjust an operating voltage of the associated CPU based on the adjusted operating frequency.

In another exemplary aspect, a method of allocating power from a power rail to a plurality of CPUs in a multi-CPU processor is provided. The method comprises receiving a current allocation request indicating a requested current allocation for a requesting CPU among the plurality of CPUs, and determining if the requested current allocation for the requesting CPU would cause a total current allocation for the plurality of CPUs to exceed a maximum rail current limit for the power rail. In response to determining that the requested current allocation for the requesting CPU would cause the total current allocation for the plurality of CPUs to exceed the maximum rail current limit for the power rail, the method comprises allocating a current allocation of the total current allocation of the power rail for each of the plurality of CPUs based on respective performance criteria of the plurality of CPUs, communicating the determined current allocation for each of the plurality of the CPUs to the plurality of LCM circuits, and setting an operating frequency of the plurality of CPUs based on the determined current allocation.

DETAILED DESCRIPTION

Figure 1:
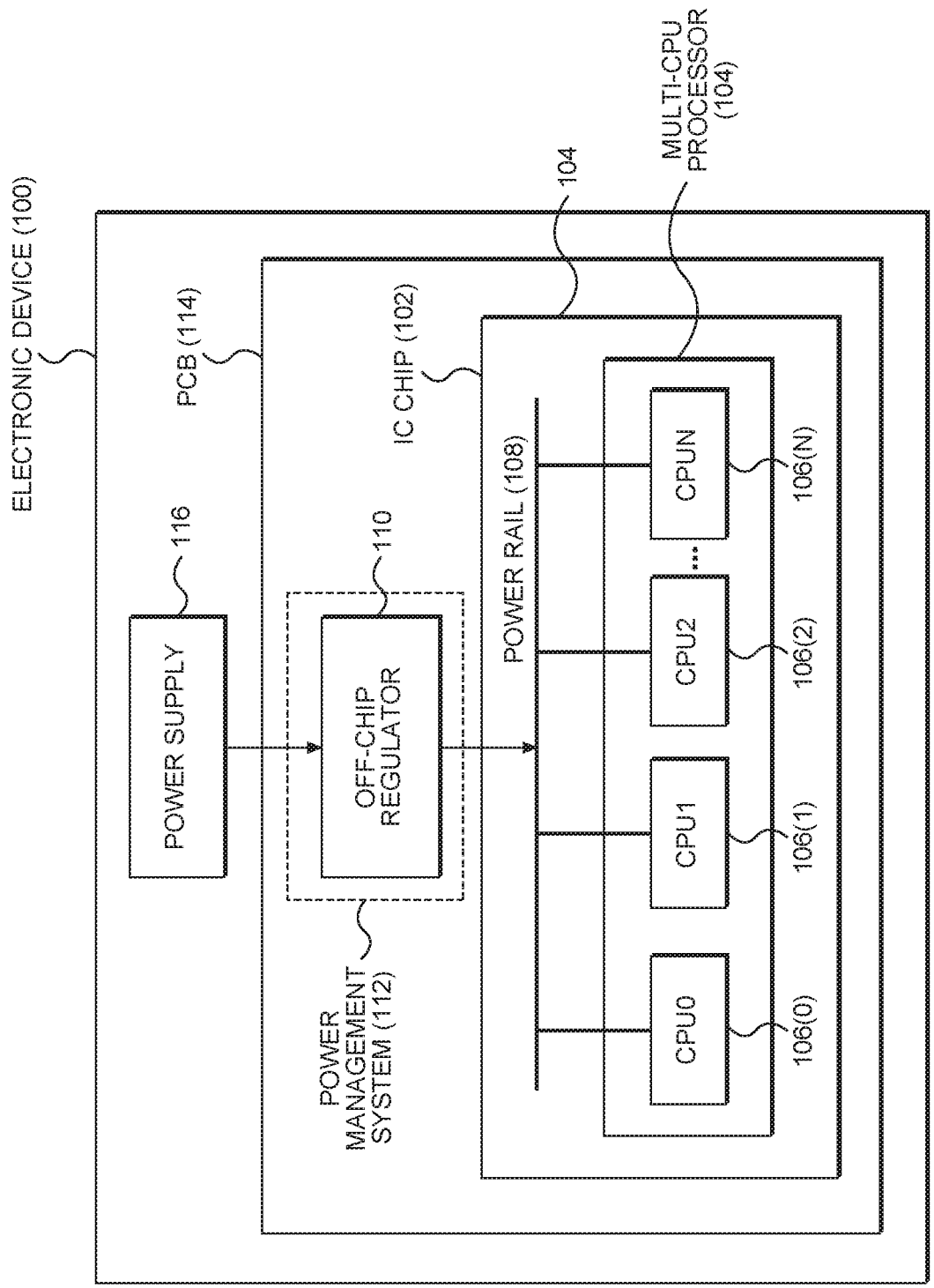
FIG. 1 is a schematic diagram of an exemplary electronic device that includes a multiple (multi-) central processing unit (CPU) processor in an integrated circuit (IC) chip and a power management system for regulating a maximum current on a power rail supplying power to the multi-CPU processor.
Figure 2:
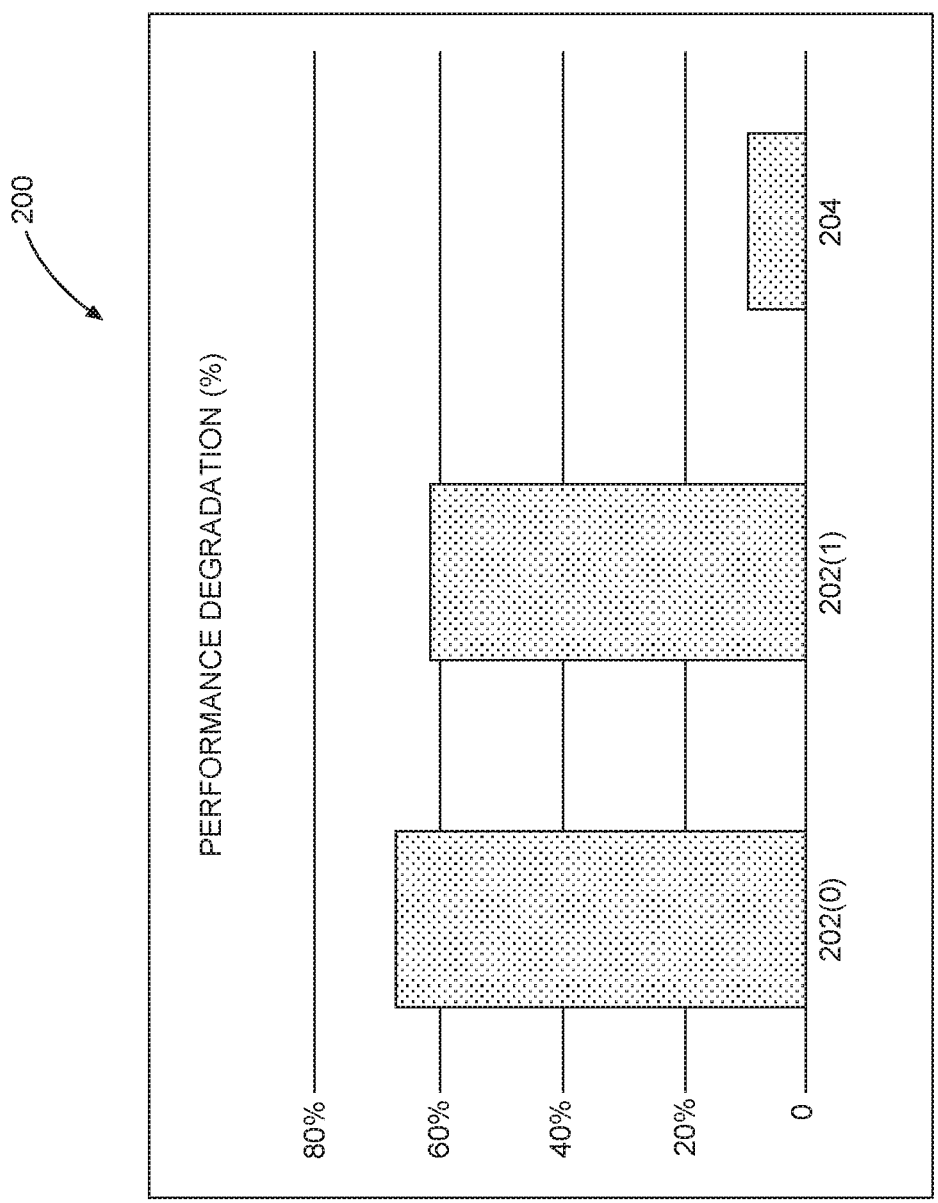
FIG. 2 is a graph illustrating exemplary performance degradations of tasks executed by a CPU of the multi-CPU processor in FIG. 1 as a result of reducing the operating voltage on the power rail supplying power to the multi-CPU processor.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed herein include allocating power between multiple central processing units (CPUs) in a multi-CPU processor based on total current availability and individual CPU quality-of-service (QoS) requirements. Multiple CPUs are electrically coupled to a common power rail to receive power for operation. Each CPU may have a different current demand on the power rail depending on the tasks being performed and their performance criteria. To avoid the cumulative current demand from each of the CPUs being greater than a maximum rail current limit for the power rail, a global current manager (GCM) circuit is provided. The GCM circuit is configured to limit the total current demand from the power rail from exceeding a maximum rail current limit of the power rail. If the total current demand exceeds the maximum rail current limit, the GCM circuit could lower the voltage level of the power rail to lower the current demand of each of the CPUs. However, some CPUs may be executing higher performance tasks such that lowering their operating voltage would reduce their QoS, whereas other CPUs may be executing lower performance tasks with operating voltage margin where lowering the operating voltage would not affect their QoS. For example, some tasks (e.g., compute-bound tasks) are more sensitive than other tasks (e.g., memory-bound tasks) to voltage, frequency, and current allocations. Some tasks may also be more important to a system or user than other tasks.

Thus, to avoid unnecessarily being required to lower the voltage level of the power rail, thus reducing the operating voltage to all the CPUs equally, the GCM circuit is configured to allocate current demand for each of the CPUs based on their desired current allocations. In this regard, in exemplary aspects disclosed herein, the GCM circuit is configured to set an initial operating voltage of the power rail (e.g., through a power regulator) based on the initial performance criteria reported by local current manager (LCM) circuits associated with respective CPUs. The GCM circuit sets initial current allocations for the CPUs based on the initial performance criteria reported by the LCM circuits. The LCM circuits are local circuits that are configured to monitor and maintain the current demand of their associated CPUs within their allocated current allocation set by the GCM circuit. As CPUs start executing their workloads based on performance criteria, the LCM circuits can request additional current allocation to the GCM circuit for their associated CPU beyond their allocated current allocation based on their workload activity, such as to avoid reducing QoS. The LCM circuits constrain current demand (e.g., by controlling operating frequency) from their associated CPUs until and if additional current allocation is approved by the GCM circuit. If the increased current allocation requests from the LCM circuits keep the total current demand from the power rail within its maximum rail current limit, the GCM circuit can approve the increased current allocation request and communicate a new current allocation to the LCM circuit associated with the requesting CPU. This allows the requesting LCM circuit to allow its associated CPU to execute a workload with increased performance that requires additional current demand according to the new increased current allocation. If the increased current allocation requests from the LCM circuits do not keep the total current demand from the power rail within its maximum rail current limit, the GCM circuit may allocate current to the CPUs based on their performance criteria. Performance criteria may include relative or absolute CPU performance targets or a relative CPU priority (e.g., weight) as non-limiting examples. The GCM circuit is configured to allocate current to the CPUs according to their relative performance criteria. The GCM circuit is configured to communicate to the LCM circuits to adjust the operating voltage of their respective CPUs to effectuate the current allocations to the CPUs. The LCM circuit can adjust (i.e., reduce, increase, or maintain) its operating voltage and/or frequency according to the adjusted current allocation. For example, the LCM circuit may communicate to a local voltage regulator to adjust the operating voltage provided to the respective CPU based on the adjusted current allocation.

Thus, in examples disclosed herein, current available from the power rail is allocated by the GCM circuit related to the performance criteria set by the CPUs and their relative priorities with respect to each other. A lower current demand from a CPU with a lower performance criteria, and thus lower current allocation demand, allows additional current to be allocated to another CPU with a higher performance criteria and higher current allocation demand, without exceeding a maximum rail current limit. This can allow CPUs executing higher performance tasks to have a larger current allocation than CPUs executing lower performance tasks without the maximum rail current limit being exceeded, and without having to necessarily lower the voltage of the power rail which could unnecessarily lower the performance of all CPUs. However, as a safeguard, if the current allocation requested from all the CPUs exceeds the maximum rail current limit (or after a determined amount of time) even with the individual, current allocations set for each of the CPUs, the GCM circuit can resort to reducing the voltage on the power rail as a secondary effort, thus causing the LCM circuits to force their CPUs to operate at relatively lower frequencies to restrict their current consumption. The LCM circuits can continue to request additional current allocation such that the GCM circuit may adjust the current allocations to the CPUs to try to satisfy the current demand from all CPUs.

Figure 3:
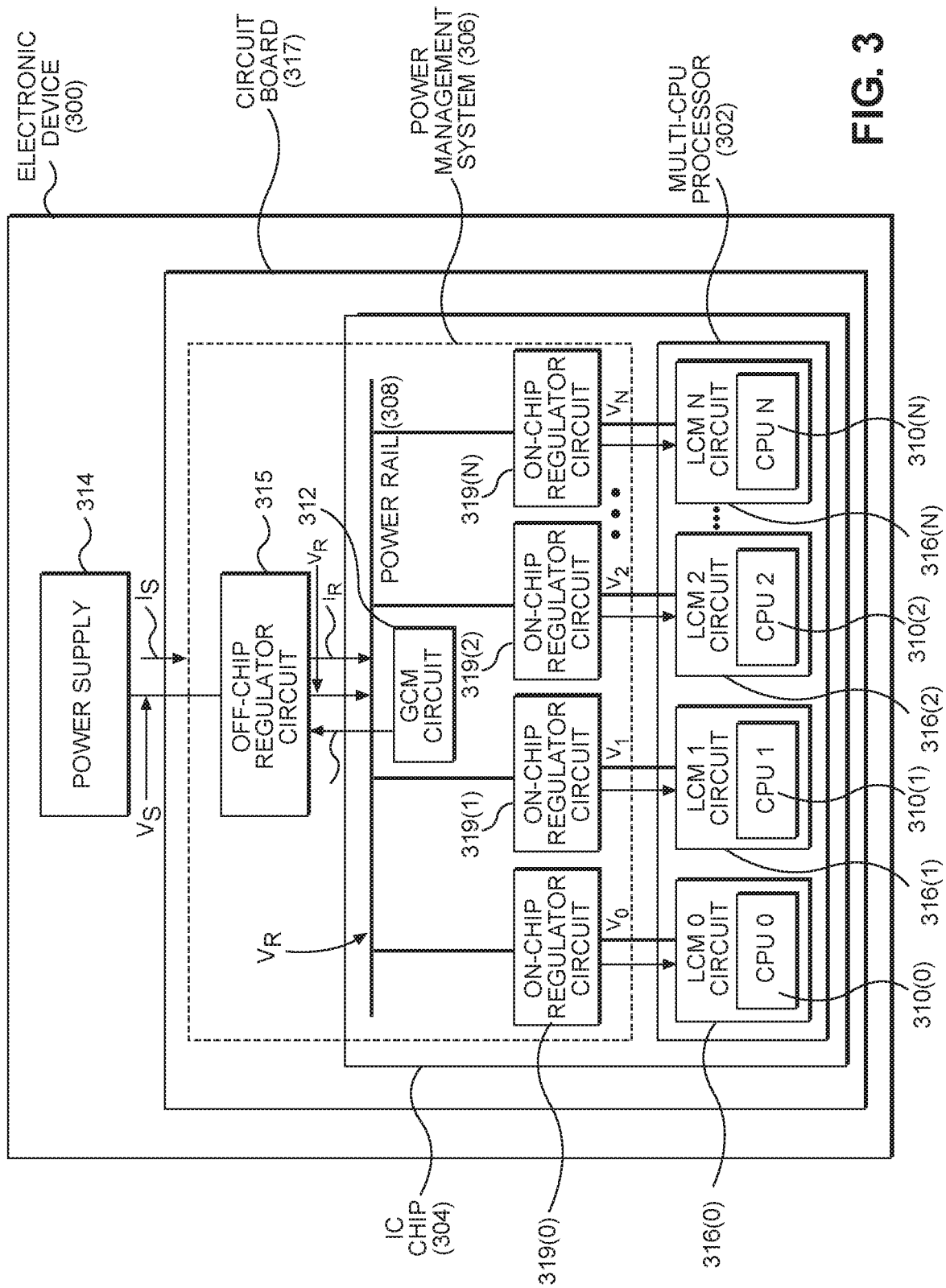
FIG. 3 is a schematic diagram of an exemplary electronic device that includes a multi-CPU processor in an IC chip and a power management system configured to allocate current between multiple CPUs in the multi-CPU processor based on total current availability and individual CPU quality-of-service (QoS) requirements.

In this regard, FIG. 3 is a schematic diagram of an exemplary electronic device 300 that includes a multi-CPU processor 302 in an IC chip 304 that also includes a power management system 306. As will be discussed in more detail below, the power management system 306 is configured to allocate power on a power rail 308 between multiple CPUs 310(0)-310(N) in the multi-CPU processor 302 based on total current availability and individual CPU's 310(0)-310(N) QoS requirements. The CPUs 310(0)-310(N) may also be referred to as processor cores. The IC chip 304 includes the power rail 308 that supplies power to the CPUs 310(0)-310(N) for operation. A GCM circuit 312 is provided as part of the power management system 306 and is configured to allocate current to the CPUs 310(0)-310(N) so that the total current draw by the CPUs 310(0)-310(N) does not exceed a maximum rail current limit of the power rail 308. Before discussing the allocation of power to multiple CPUs 310 (0)-310(N) in the multi-CPU processor 302, other components of the power management system 306 are first discussed.

In this regard, as illustrated in FIG. 3, an off-chip regulator circuit 315 is provided on a circuit board 317 that includes the IC chip 304 to interface a power supply 314 to the power rail 308. Note that the off-chip regulator circuit 315 could also be located on-chip in the IC chip 304 as an alternative implementation. The power supply 314 may be located off of the circuit board 317. As one example, the power supply 314 may be a battery. The off-chip regulator circuit 315 regulates a supply voltage $V_S$ provided by the power supply 314 to provide a regulated voltage $V_R$ applied to the power rail 308 to provide an operating voltage to the CPUs 310(0)-310(N) for operation. The GCM circuit 312 can instruct the off-chip regulator circuit 315 to adjust the regulated voltage $V_R$ applied to the power rail 308, if needed, to increase or decrease current draw from the CPUs 310(0)-310(N). As will be discussed in more detail below, the GCM circuit 312 is configured to cause the off-chip regulator circuit 315 to adjust the regulated voltage $V_R$ to ensure that the maximum rail current limit of the power rail 308 is not exceeded due to the current demand of the CPUs 310(0)-310(N). In this example, the GCM circuit 312 is on-chip in the IC chip 304, but could also be provided off-chip and outside of the IC chip 304 if desired. As will also be discussed in more detail below, the GCM circuit 312 is also configured to allocate power on the power rail 308 between multiple CPUs 310(0)-310(N) in the multi-CPU processor 302 based on total current availability so as to not exceed the maximum rail current limit of the power rail 308 and the individual CPUs' 310(0)-310(N) QoS requirements.

With continuing reference to FIG. 3, the IC chip 304 also includes on-chip regulator circuits 319(0)-319(N) that are associated with a respective CPU 310(0)-310(N), wherein 'N' can be any positive whole number to signify N+1 CPUs 310(0)-310(N). As an example, the on-chip regulator circuits 319(0)-319(N) may be low-drop (LDO) regulators that regulate output voltage even when the regulated voltage $V_R$ at the power rail 308 is close to the supply voltage $V_S$ of the power supply 314. The on-chip regulator circuits 319(0)-319(N) are configured to further regulate the regulated voltage $V_R$ to provide individualized, regulated operating voltages $V_0, V_1, V_2, \ldots V_N$ to the CPUs 310(0)-310(N) for operation based on their performance requirements and associated power demand. In this regard, LCM circuits 316(0)-316(N) are local circuits that are provided as part of the CPUs 310(0)-310(N) in the chip 304 and associated with a particular designated CPU 310(0)-310(N). The LCM circuits 316(0)-316(N) are configured to monitor and constrain respective regulated currents $I_0, I_1, I_2, \ldots I_N$ demanded by their respective CPUs 310(0)-310(N) from the power rail 308 according to the workload performance requirements of the CPUs 310(0)-310(N) and according to a current allocation set for the respective CPUs 310(0)-310(N) by the GCM circuit 312. Currents $I_0, I_1, I_2, \ldots I_N$; are divided currents from the total regulated current $I_R$ made available on the power rail 308 according to the regulated operating voltages $V_0, V_1, V_2 \ldots V_N$ according to the power demand of the CPUs 310(0)-310(N). The LCM circuits 316(0)-316(N) can cause their respective on-chip regulator circuits 319(0)-319(N) to adjust their respective operating voltages $V_0, V_1, V_2 \ldots V_N$ to control the current draw by their respective CPUs 310(0)-310(N). Thus, for example, if a CPU 310(0)-310(N) requires more current draw to satisfy workload performance, the associated LCM circuit 316(0)-316(N) can increase the operating frequency of the CPU 310(0)-310(N) and also cause the associated on-chip regulator circuit 319(0)-319(N) to increase its operating voltage $V_0, V_1, V_2 \ldots V_N$ to support operating of the associated CPU 310(0)-310(N) at the increased performance criteria. Performance criteria may include relative or absolute CPU performance targets or relative CPU priority (e.g., weight) as non-limiting examples. Similarly, if a CPU 310(0)-310(N) requires less current draw to satisfy workload performance, the associated LCM circuit 316(0)-316(N) can reduce the operating frequency of the CPU 310(0)-310(N) and also cause the associated on-chip regulator circuit 319(0)-319(N) to reduce its operating voltage $V_0, V_1, V_2 \ldots V_N$ to conserve power.

To avoid the cumulative current demand from each of the CPUs 310(0)-310(N) being greater than the maximum rail current limit for the power rail 308, the GCM circuit 312 is configured to limit the total current demand from the power rail 308 from exceeding a maximum rail current limit of the power rail 308. If the total current demand exceeds the maximum rail current limit, the GCM circuit 312 could cause the off-chip regulator circuit 315 to lower a voltage level of regulated voltage $V_R$ applied to the power rail 308 to lower the operating voltages $V_0$-$V_N$ of the CPUs 310(0)-310(N), and thus the current demand of the CPUs 310(0)-310(N). However, some CPUs 310(0)-310(N) may be executing higher performance tasks where lowering their operating voltage would reduce their QoS, whereas other CPUs 310(0)-310(N) may be executing lower performance tasks with operating voltage margin where lowering the operating voltage would not affect their QoS. For example, some tasks (e.g. compute-bound tasks) are more sensitive than other tasks (e.g. memory-bound tasks) to voltage, frequency, and/or current allocations. Higher performance tasks may also be those tasks that are of particular importance to a system or a user even if less sensitive to voltage, frequency, and/or current allocation. It can be advantageous to take both the efficiency and relative importance of tasks performed by a CPU 310(0)-310(N) into account by the GCM circuit 312.

Thus, to avoid being required to lower the voltage level of the regulated voltage $V_R$ of the power rail 308, thus equally reducing the operating voltages $V_0$-$V_N$ for all the CPUs 310(0)-310(N), the GCM circuit 312 is configured to allocate current demand for each of the CPUs 310(0)-310(N) based on their desired current allocations. As will be discussed in more detail below, an initial individual current allocation is set for each of the CPUs 310(0)-310(N) by the GCM circuit 312 based on the performance criteria set by the CPUs 310(0)-310(N). The performance criteria set by the CPUs 310(0)-310(N) may be configured by the respective CPUs 310(0)-310(N) (e.g., their operating systems (OSs)) based on operating voltage and frequency scaling performed by the LCM circuits 316(0)-316(N) for their respective CPUs 310(0)-310(N). For example, the respective system software of the CPUs 310(0)-310(N) may set operating performance including the operating voltage and frequency. The system software may include an operating system, a hypervisor, or a runtime system, or some combination as examples. The LCM circuits 316(0)-316(N) are configured to communicate their initial requested current demands of their respective CPUs 310(0)-310(N) to the GCM circuit 312. The GCM circuit 312 causes the off-chip regulator circuit 315 to set the voltage level of the regulated voltage $V_R$ based on the highest current demand among the CPUs 310(0)-310(N) without exceeding the maximum rail current limit of the power rail 308.

As the CPUs 310(0)-310(N) start executing their workloads based on their performance criteria, the LCM circuits 316(0)-316(N) can request additional current allocation from the GCM circuit 312, if needed, for their associated CPU 310(0)-310(N) beyond their allocated current budget in the GCM circuit 312, such as to avoid reducing QoS. The LCM circuits 316(0)-316(N) control the operating frequency and operating voltages $V_0$-$V_N$ for their respective CPUs 310(0)-310(N) to constrain respective currents $I_0$-$I_N$ until and if additional current allocation is granted by the GCM circuit 312. If the increased current allocation requests keeps the total current demand from the power rail 308 within its maximum rail current limit, the GCM circuit 312 can grant the increased current allocation request and communicate a new current allocation to the LCM circuits 316(0)-316(N) associated with the requesting CPU 310(0)-310(N). This allows the requesting LCM circuits(s) 316(0)-316(N) to increase the operating frequency of its associated CPU(s) 310(0)-310(N) and the respective operating voltage (s) $V_0$-$V_N$ to support an increase in operating frequency according to the increased current allocation granted by the GCM circuit 312. If the increased current allocation requests would not keep the total current demand from the power rail 308 within its maximum rail current limit, the GCM circuit 312 can deny the increased current allocation request, such that the requesting LCM circuit 316(0)-316(N) will not increase the operating frequency and its operating voltage $V_0$-$V_N$, keeping current demand constrained. However, if a request for additional current allocation is denied by the GCM circuit 312, the GCM circuit 312 may allocate current to the CPUs 310(0)-310(N) based on a relative CPU 310(0)-310(N) priority, if such allows the additional current allocation to be granted without exceeding the maximum rail current limit of the power rail 308.

Figure 4:
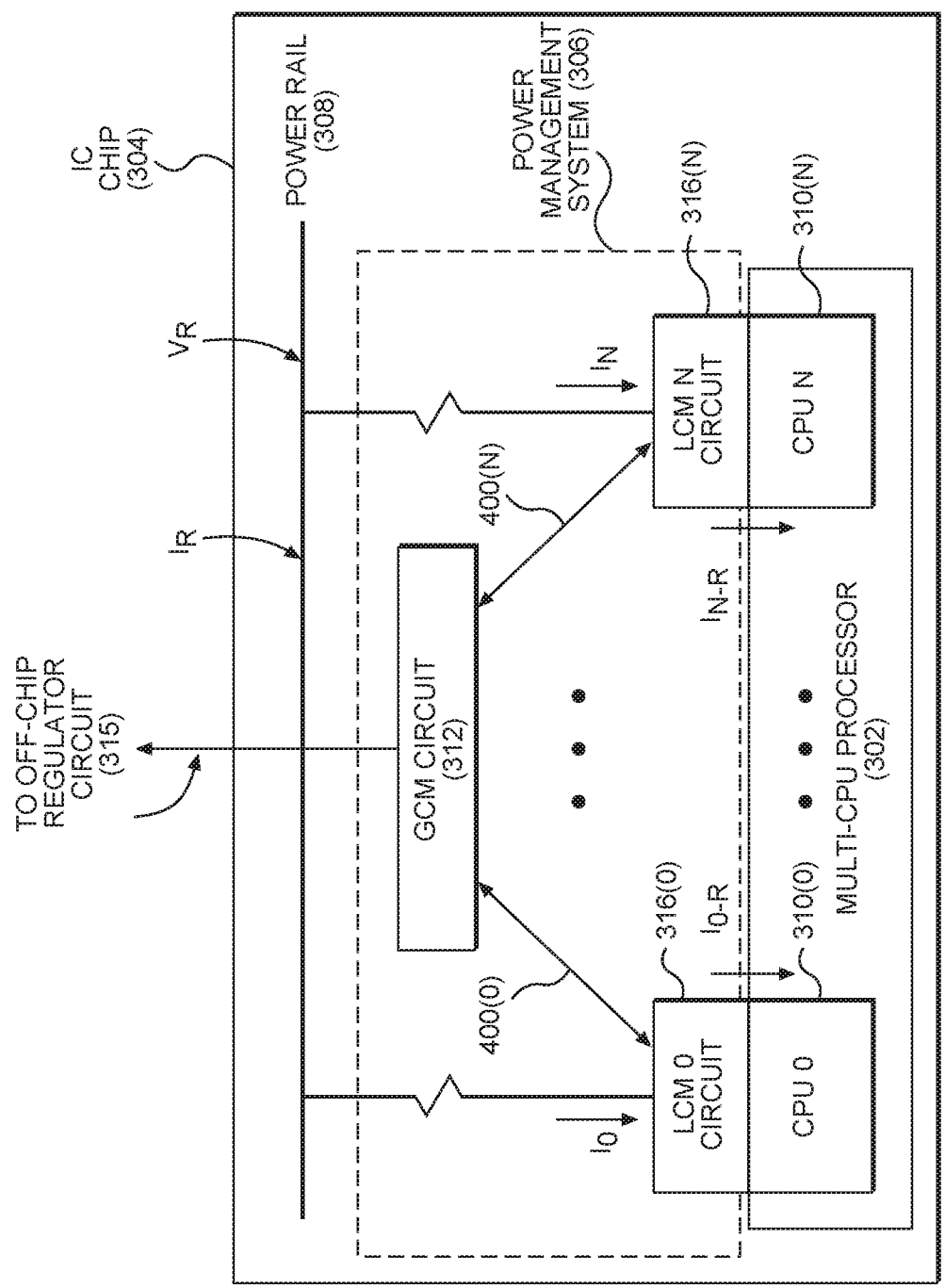
FIG. 4 is a schematic diagram of the IC chip in FIG. 3 with the power management system that includes a global current management (GCM) circuit configured to monitor current on the power rail and allocate current to CPUs.
Figure 5:
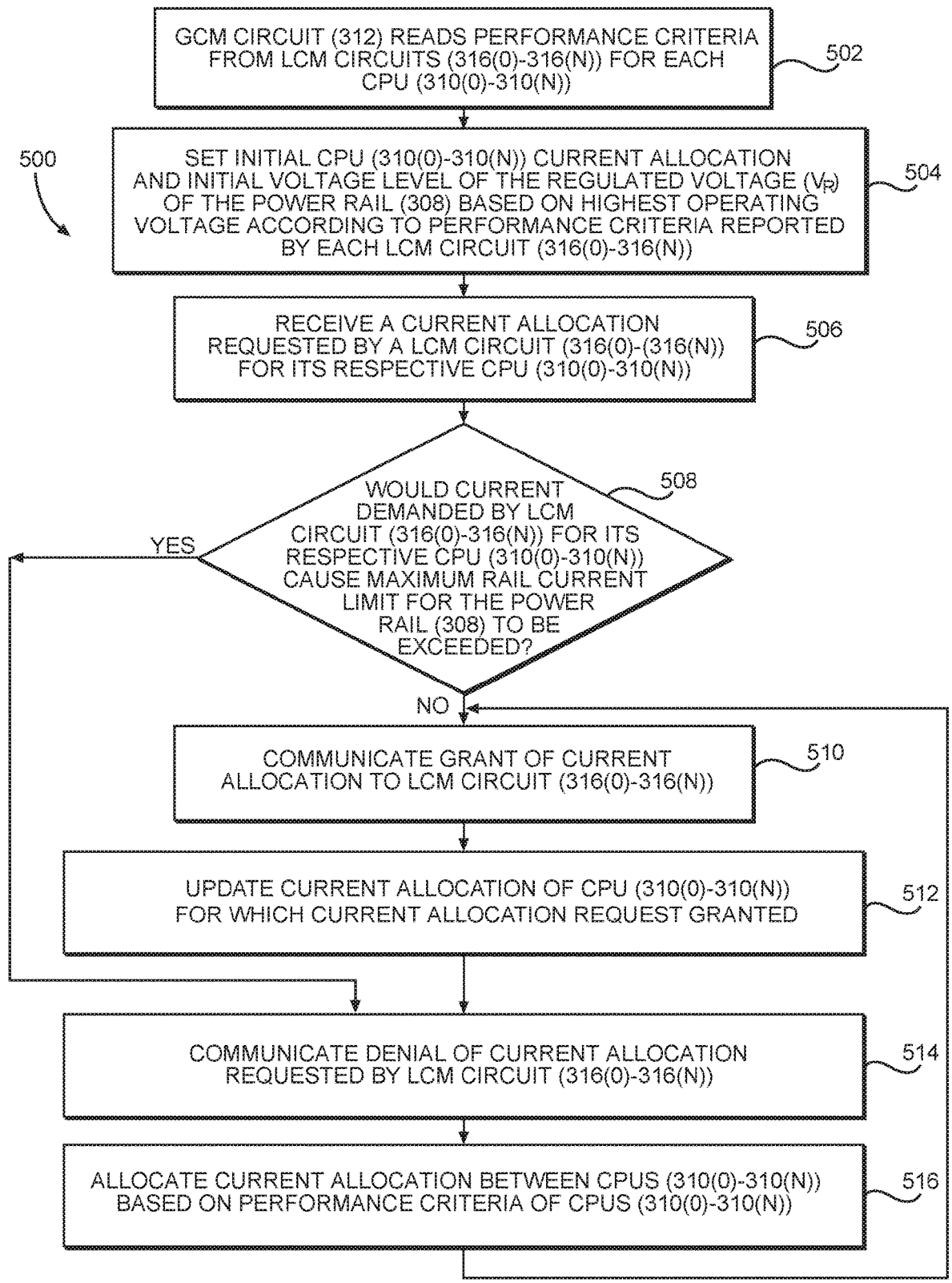
FIG. 5 is a flowchart illustrating an exemplary process of the GCM circuit in the power management system in FIG. 4 determining current allocations for the CPUs and communicating adjusted current allocations to local current manager (LCM) circuits associated with the respective CPUs based on current allocation requests from the CPUs.
Figure 6:
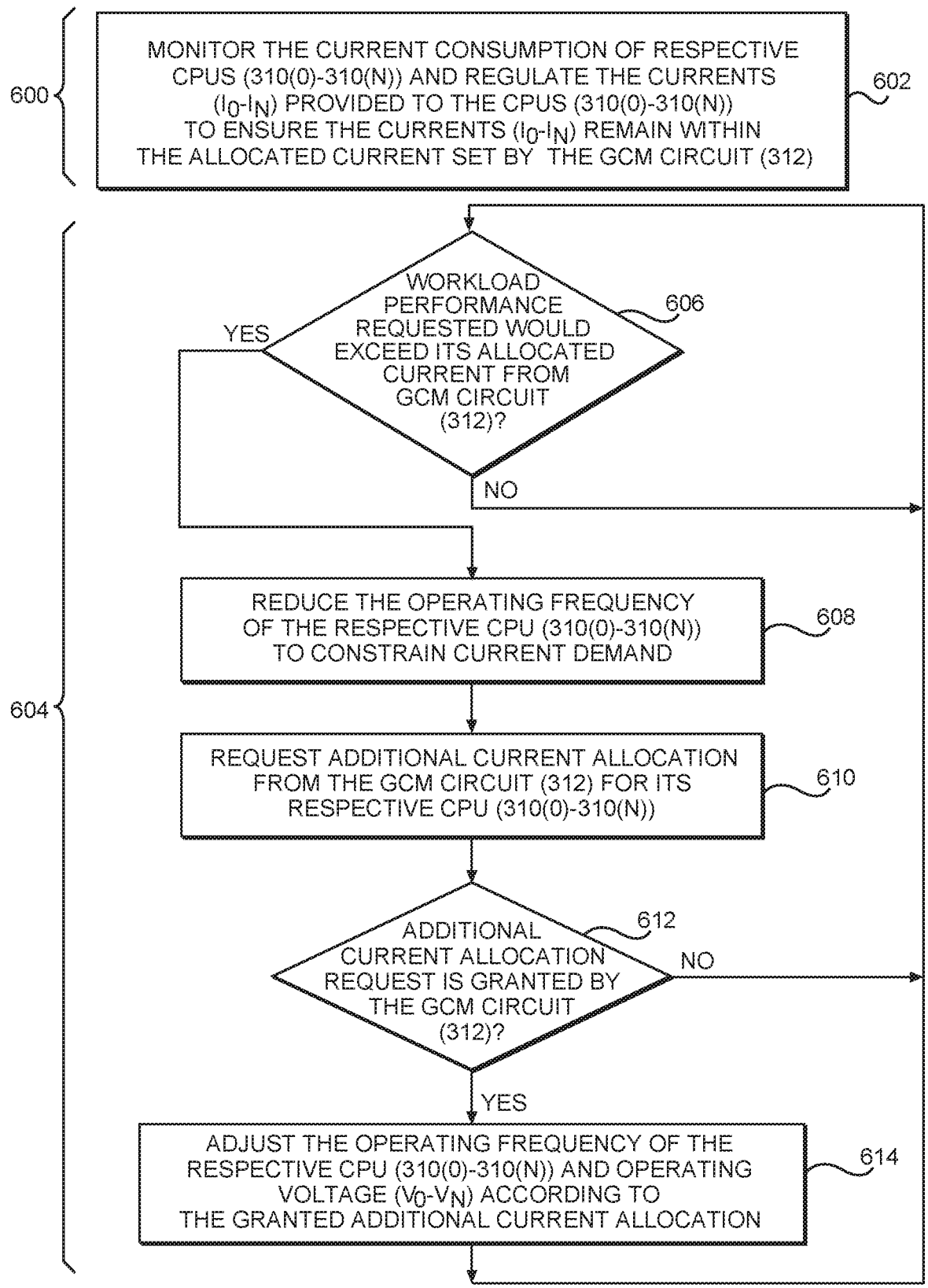
FIG. 6 is a flowchart illustrating an exemplary process performed by the LCM circuits in the power management system in FIG. 4 for monitoring and maintaining the current demand of their associated CPUs within their allocated current allocations set by the GCM circuit, and requesting additional current allocations to the GCM circuit based on workload activity of their respective CPUs to avoid reducing QoS.

In this regard, to provide additional exemplary detail of the operation of the power management system 306 in the IC chip 304 in FIG. 3, FIG. 4 is provided. FIG. 4 is a more detailed schematic diagram of the power management system 306 in the IC chip 304 in FIG. 3, which illustrates the GCM circuit 312 and the LCM circuits 316(0)-316(N) of the CPUs 310(0)-310(N). FIG. 5 is a flowchart illustrating an exemplary processes 500 that can be performed by the GCM circuit 312 in the power management system 306 in FIG. 4 to set current allocations and respond to requests for additional current allocation from the LCM circuits 316(0)-316(N) of the CPUs 310(0)-310(N). FIG. 6 is a flowchart illustrating an exemplary process 600 that can be performed by each of the LCM circuits 316(0)-316(N) in the power management system 306 in FIG. 4 for monitoring and constraining the current demand of their associated CPUs 310(0)-310(N) within their allocated current allocation set by the GCM circuit 312, and communicating requests for additional current allocation to the GCM circuit 312 based on the workload activity of their respective CPUs 310(0)-310(N), such as to avoid reducing QoS. The exemplary operation of the GCM circuit 312 will be discussed in regard to the exemplary process 500 in FIG. 5 referencing FIGS. 3 and 4. The exemplary operation of the LCM circuits 316(0)-316(N) will be discussed in regard to the exemplary process 600 in FIG. 6 referencing FIGS. 3 and 4. Note that in this example, the GCM circuit 312 is a circuit that is realized as a physical global circuit to each of the LCM circuits 316(0)-316(N) that is to communicate with each of the LCM circuits 316(0)-316(N). However, alternatively, the GCM circuit 312 could be logically global circuit, but actually realized in hierarchical circuits distributed across multiple hardware circuits or elements in the IC chip 304 and/or power management system 306 therein.

In this regard, with reference to FIG. 4, as discussed above, the GCM circuit 312 is responsible for ensuring that the total current allocation of the CPUs 310(0)-310(N) does not exceed a maximum rail current limit of the power rail 308 prescribed according to predefined design specifications. The GCM circuit 312 performs a process to determine current allocations for the CPUs 310(0)-310(N) based on their workload activity to avoid reducing QoS and without exceeding the maximum rail current limit of the power rail 308. In this regard, with reference to FIG. 4 and the process 500 in FIG. 5, the GCM circuit 312 reads the performance criteria from the LCM circuits 316(0)-316(N) for each CPU 310(0)-310(N) (block 502 in FIG. 5). The GCM 312 is able to communicate with the LCM circuits 316(0)-316(N) over communications lines 400(0)-400(N) in FIG. 4, which, for example, may be dedicated metal lines or a communications bus in the IC chip 304. The GCM circuit 312 then causes the off-chip regulator circuit 315 to set the initial regulated voltage $V_R$ based on the highest operating voltage $V_0$-$V_N$ to satisfy the current demand of the CPUs 310(0)-310(N) as reported by each LCM circuit 316(0)-316(N) for each CPU 310(0)-310(N) (block 504 in FIG. 5). The current demands requested by the LCM circuits 316(0)-316(N) for their respective CPUs 310(0)-310(N) are based on the workload requirements of the CPUs 310(0)-310(N). The GCM circuit 312 also sets the current allocations for the CPUs 310(0)-310(N) based on their reported performance criteria (block 504 in FIG. 5).

With continuing reference to FIG. 5, the GCM circuit 312 then waits until it receives a request from a LCM circuit 316(0)-316(N) for additional current allocation for its respective CPU 310(0)-310(N) (block 506 in FIG. 5). In response, the GCM circuit 312 determines if the requested additional current allocation from the LCM circuit 316(0)-316(N) for its respective CPU 310(0)-310(N) would cause the total regulated current $I_R$ on the power rail 308 to exceed the maximum rail current limit for the power rail 308 (block 508 in FIG. 5). If not, the GCM circuit 312 grants the additional current allocation requested by the LCM circuit 316(0)-316(N) and communicates the granting of the additional current allocation to the LCM circuit 316(0)-316(N) (block 510 in FIG. 5). As will be discussed later in regard to FIG. 6, the LCM circuit 316(0)-316(N) can increase the operating frequency of its respective CPU 310(0)-310(N) and cause its local on-chip regulator circuit 319(0)-319(N) to increase operating voltages $V_0$-$V_N$ to support the increased current demand of its respective CPU 310(0)-310(N) for increased performance. The GCM circuit 312 then updates the current allocation for the CPU 310(0)-310(N) of the requesting LCM 316(0)-316(N) for the granted request so that the GCM circuit 312 can use the updated current allocation to determine the total current allocation of all CPUs 310(0)-310(N) for future additional current allocation requests (block 512 in FIG. 5). Then process 500 then repeats by returning to block 506 for the GCM circuit 312 to wait to receive additional current allocation requests.

If in block 508 in FIG. 5, the GCM circuit 312 determines that the requested additional current allocation from the LCM circuit 316(0)-316(N) for its respective CPU 310(0)-310(N) would cause the total regulated current $I_R$ on the power rail 308 to exceed the maximum rail current limit for the power rail 308, the GCM circuit 312 denies the request for additional current allocation and communicates the denial to the requesting LCM circuit 316(0)-316(N) (block 514 in FIG. 5). This causes the requesting LCM circuit 316(0)-316(N) to maintain the current operating frequency and to not increase the operating voltage $V_0$-$V_N$ for its associated CPU 310(0)-310(N), since doing such may cause the total regulated current $I_R$ on the power rail 308 to exceed the maximum rail current limit. However, the GCM circuit 312 may be able to grant the additional current allocation request if the GCM circuit 312 can adjust the current allocation(s) of another CPU(s) 310(0)-310(N) to provide additional current for the CPU 310(0)-310(N) of the requesting LCM circuit 316(0)-316(N) without the total regulated current $I_R$ on the power rail 308 exceeding the maximum rail current limit (block 516 in FIG. 5). The process 500 can then return to block 510 to communicate the grant of current allocations to the LCM circuits 316(0)-316(N). For example, a lower current demand from a CPU 310(0)-310(N) with a lower performance criteria, and thus lower current demand, may allow additional current to be allocated to another CPU 310(0)-310(N) with a higher performance criteria, and thus higher current demand without changing the overall current demand of all of the CPUs 310(0)-310(N). Allocating current from the power rail 308 can allow CPUs 310(0)-310(N) executing higher performance tasks to have a larger current allocation than CPUs 310(0)-310(N) executing lower performance tasks without the maximum rail current limit being exceeded, and without having to necessarily lower the regulated voltage $V_R$ of the power rail 308 which could unnecessarily lower the performance of all CPUs 310(0)-310(N). However, as a safeguard, if current allocation requests from the CPUs 310(0)-310(N) continually cause the GCM circuit 312 to deny such requests, the GCM circuit 312 can resort to reducing the regulated voltage $V_R$ on the power rail 308 as a secondary effort, thus forcing the CPUs 310(0)-310(N) to operate at lower performance criteria to restrict their current consumption. The regulated voltage $V_R$ on the power rail 308 can again be raised in response to the current allocation requests from the LCM circuits 316(0)-316(N) not exceeding the maximum rail current limit.

FIG. 6 is a flowchart illustrating the exemplary process 600 performed by the LCM circuits 316(0)-316(N) in the power management system 306 in FIG. 4 for monitoring and maintaining the current demand of their associated CPUs 310(0)-310(N) within their allocated current allocation set by the GCM circuit 312, and requesting additional current allocation requests from the GCM circuit 312 for their respective CPUs 310(0)-310(N). As discussed above, the LCM circuits 316(0)-316(N) are configured to request additional current allocation to the GCM circuit 312 for their respective CPUs 310(0)-310(N). The LCM circuits 316(0)-316(N) are configured to continuously monitor current consumption of their respective CPUs 310(0)-310(N) and regulate operating frequency and operating voltages $V_0$-$V_N$ from the on-chip regulator circuits 319(0)-319(N) for the CPUs 310(0)-310(N) to ensure the currents $I_0$-$I_N$ remain within the allocated currents set by the GCM circuit 312 (block 602 in FIG. 6). In a separate process 604 shown in FIG. 6, the LCM circuits 316(0)-316(N) are configured to continue to determine if requested performance of an associated CPU 310 (0)-310(N) would require current $I_0$-$I_N$ that exceeds its allocated current from the GCM circuit 312 (block 606 in FIG. 6). If the requested performance of the CPU 310(0)-310(N) would not require current $I_0$-$I_N$ that exceeds its allocated current from the GCM circuit 312, the LCM circuit 316(0)-316(N) continues to determine if requested performance of the CPU 310(0)-310(N) would require current $I_0$-$I_N$ that exceeds its allocated current from the GCM circuit 312 (block 606 in FIG. 6). If the requested performance of the CPU 310(0)-310(N) would require current $I_0$-$I_N$ that exceeds its allocated current from the GCM circuit 312, the LCM circuit 316(0)-316(N) does not increase the operating frequency and instruct the respective on-chip regulator circuit 319(0)-319(N) to increase operating voltage $V_0$-$V_N$. The LCM circuit 316(0)-316(N) reduces the operating frequency of its CPU 310(0)-310(N) to constrain current demand (block 608 in FIG. 6). The LCM circuit 316(0)-316(N) then requests additional current allocation from the GCM circuit 312 for its respective CPU 310(0)-310(N) (block 610 in FIG. 6). If the requested additional current allocation is granted by the GCM circuit 312 (block 612 in FIG. 6), the GCM circuit 312 can adjust the operating frequency of its CPU 310(0)-310(N) according to the granted additional current allocation so that the CPU 310 (0)-310(N) can operate at a higher performance criteria (block 614 in FIG. 6). The GCM circuit 312 can instruct the on-chip regulator circuit 319(0)-319(N) to increase the operating voltage $V_0$-$V_N$ for its CPU 310(0)-310(N) to support operating at the increased operating frequency (block 614 in FIG. 6). The LCM circuit 316(0)-316(N) then continues to determine if requested performance of the CPU 310(0)-310 (N) would require current $I_0$-$I_N$ that exceeds its allocated current from the GCM circuit 312 (block 606 in FIG. 6). If the requested additional current allocation is not granted by the GCM circuit 312 (block 612 in FIG. 6), the LCM circuit 316(0)-316(N) continues to determine if requested performance of the CPU 310(0)-310(N) would require current $I_0$-$I_N$ that exceeds its allocated current from the GCM circuit 312 (block 606 in FIG. 6) to then again request additional current allocation from the GCM circuit 312 (block 606 in FIG. 6).

There are different ways in which the current can be allocated by the GCM circuit 312 to the CPUs 310(0)-310 (N) in the multi-CPU processor 302 in FIG. 3 if the cumulative requested current allocation by the CPUs 310 (0)-310(N) exceeds the maximum rail current limit of the power rail 308. For example, a current allocation may be minimum and maximum current range. As another example, a current allocation may be based on a weight-based proportional sharing according to assigned weights to the CPUs 310(0)-310(N). In some embodiments, relative weight-based allocations may be constrained by optional reservations or limits that specify an absolute range. For example, consider a total current allocation budget of six (6) current units of current allocated to three tasks with equal weights. In this example, each of tasks could be assigned a current allocation two (2) current units, wherein the current allocations are directly proportional to weights. But suppose two (2) constraints are further added, where one (1) task is not allowed to use more than one (1) current unit, and another task must get at least three (3) current units. In this case, the resulting current allocations for the tasks will be would be one (1), two (2), and three (3) current units, which is not directly proportional to weights of the tasks, due to an absolute minimum current allocation reservation and maximum current limit constraint.

As discussed above in the process 604 in FIG. 6, the CPUs 310(0)-310(N) request current demand allocation through their LCM circuits 316(0)-316(N) based on their performance criteria needed to provide the desired QoS for the workloads executed. As an example, the OSs of the CPUs 310(0)-310(N) may be configured to communicate certain parameters to their respective LCM circuits 316(0)-316(N) such that the LCM circuits 316(0)-316(N) can determine the amount of current allocation to request from the GCM circuit 312. In this regard, as an example, the CPUs 310(0)-310(N) may be configured to provide an absolute reserved performance target to its respective LCM circuit 316(0)-316 (N) as an absolute reserved performance criteria so that a minimum current allocation is provided to guarantee a minimum level of performance. This may be for tasks executed by the CPUs 310(0)-310(N) with hard response time requirements. The LCM circuits 316(0)-316(N) are configured to translate the absolute reserved performance target into an operating voltage and current allocation to meet the minimum performance level. The CPUs 310(0)-310(N) may also be configured to provide an absolute limit performance target as an absolute limit performance criteria to its respective LCM circuits 316(0)-316(N) to indicate the maximum performance level a CPU 310(0)-310(N) can reach. Setting this parameter could be useful when there are lower priority tasks (e.g., background jobs) for which the system administrator wants to enforce a maximum allocation in the CPU 310(0)-310(N). The LCM circuits 316(0)-316(N) are configured to translate the absolute limit performance target into an operating voltage and current allocation to meet the maximum performance target. The CPUs 310 (0)-310(N) may also be configured to provide a relative weight as a CPU performance criteria to its respective LCM circuits 316(0)-316(N) to indicate a priority for the CPU 310(0)-310(N). CPUs 310(0)-310(N) with higher weights can be configured to receive greater current allocation and are penalized less in current-constrained environment.

For example, if an LCM circuit 316(0)-316(N) is reducing the operating frequency of an associated CPU 310(0)-310 (N) to avoid exceeding its current allocation, as discussed above, the LCM circuit 316(0)-316(N) requests additional current allocation for its CPU 310(0)-310(N) to the GCM circuit 312, which, if granted, would not cause any reduction in local operating frequency. As one exemplary option, if an LCM circuit 316(0)-316(N) is reducing operating frequency by X %, then it can be configured to request a desired current allocation from the GCM circuit 312 according to formula (1) below:

$$\text{requested current allocation} = \frac{\text{avg. current consumption}}{\left(1 - \frac{X}{100}\right)} \quad (1)$$

The rationale behind formula (1) is that if the operating frequency of the CPU 310(0)-310(N) associated with the additional current allocation request was reduced by 50% in past, the associated LCM circuit 316(0)-316(N) should ask for a 2× average current allocation from the GCM circuit 312. Once the GCM circuit 312 grants the LCM circuit's 316(0)-316(N) current allocation request, the LCM circuit 316(0)-316(N) adjusts operating voltage $V_0$-$V_N$ and operating frequency for its respective CPU 310(0)-310(N) to meet the allocated current.

In another exemplary option, as discussed above in the process 500 in FIG. 5, the GCM circuit 312 may be configured to request the LCM circuits 316(0)-316(N) to report their desired current allocations for their respective CPUs 310(0)-310(N). Once all LCM circuits 316(0)-316(N) respond back, the GCM circuit 312 adjusts desired current allocation requests of each LCM circuit 316(0)-316(N) based on its absolute reserved performance target and absolute limit performance target parameters set by the respective CPU 310(0)-310(N). The adjusted desired current allocation can be a function of:

adjusted desired current allocation=min(max(reserved,desired alloc.),limit).

The GCM circuit 312 accepts all adjusted desired current allocations if the following condition below holds true:

Σ adjusted desired current allocation<maximum rail current limit

Otherwise, the GCM circuit 312 allocates current to CPUs 310(0)-310(N) proportionally to their weights in this example per following a proportional sharing algorithm in this example. The GCM circuit 312 first initiates per-CPU 310(0)-310(N) allocations with the LCM circuit's 316(0)-316(N) absolute reserved performance target current allocations. Then iteratively, the GCM circuit 312 adds epsilon current (e.g., 0.1 Amp) to each CPU's 310(0)-310(N) current allocation. These current allocation additions occur with different frequencies, which are proportional to the LCM circuit's 316(0)-316(N) relative weights. If any LCM circuit 316(0)-316(N) reaches its current allocation limit, the GCM circuit 312 stops adding epsilon to that CPU's 310(0)-310(N) current allocation. This process continues until the GCM circuit 312 allocates the available regulated current $I_R$ on the power rail 308.

Figure 7:
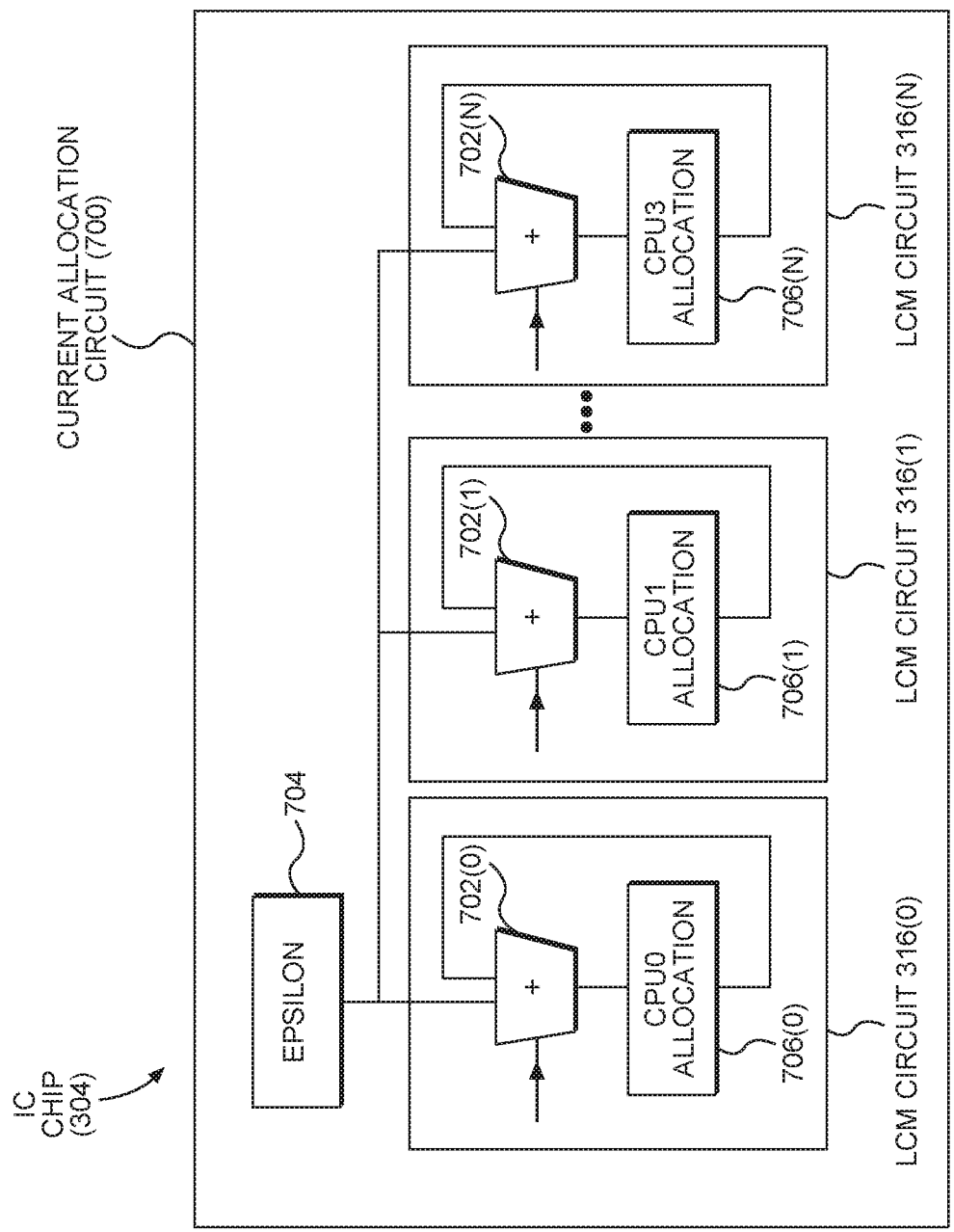
FIG. 7 is a schematic diagram of an exemplary current allocation circuit that can be included in the GCM circuit in FIG. 4 to determine a current allocation for the CPUs.

In this regard, FIG. 7 is a schematic diagram of an exemplary current allocation circuit 700 that can be included in the GCM circuit 312 in FIG. 4 to determine a proportional current allocation for the CPUs 310(0)-310(N). In this regard, to implement a proportional current allocation sharing algorithm in the GCM circuit 312, an adder circuit 702(0)-702(N) can be provided in the current allocation circuit 700 for each LCM circuit 316(0)-316(N). Each adder circuit 702(0)-702(N) adds a fixed epsilon 704 (e.g., 0.1 amp) to its corresponding LCM circuit's 316(0)-316(N) current allocation. The current allocation of each LCM circuit 316(0)-316(N) is stored in a register 706(0)-706(N). The size of the register 706(0)-706(N), in bits, is determined by a maximum feasible current (e.g., 3 Amps). The current allocation for each LCM circuit 316(0)-316(N) is calculated by the current allocation circuit 700 in an iterative process. In each iteration, the adder circuits 702(0)-702(N) add epsilon 704 to their respective current allocations for the circuits 316(0)-316(N). Different adder circuits 702(0)-702(N) operate at different frequencies, which are proportional to weights. An adder circuit 702(0)-702(N) associated with a CPU 310(0)-310(N) having a higher weight adds faster than an adder circuit 702(0)-702(N) associated with a CPU 310(0)-310(N) with a lower weight. To model different frequencies, each adder circuit 702(0)-702(N) can be associated with a shift register, the size of which is determined by the maximum weight. For instance, if feasible weights are {1, 2, 3, 4}, then the shift register will be a 4-bit register. For an LCM circuit 316(0)-316(N) with a weight of four (4),
all four (4) bits would be set to '1'. For an LCM circuit 316(0)-316(N) with a weight of one (1), only one (1) bit is set to one (1). At each iteration, the adder circuit 702(0)-702(N) adds if the least significant bit (LSB) of the shift register is set to one (1). At the end of each iteration, the shift register is shifted to right by one (1) bit.

Since the current allocations are initiated with the reserved allocations in this example, the adder circuits 702(0)-702(N) have a start time to start adding. For example, consider two (2) LCM circuits 316(0) and 316(1). LCM circuit's 316(0) weight is four (4) and LCM circuit's 316(1) weight is one (1). Suppose that the reserved allocation of LCM circuit 316(0) is zero and the reserved allocation of LCM circuit 316(1) is 2.5. Suppose further that both LCM circuits' 316(0), 316(1) desired current allocations are 3 Amps. In the current allocation circuit 700 in the GCM circuit 312, the adder circuit 702(0) for LCM circuit 316(0) adds epsilon 704=0.5 every iteration, and the adder circuit 702(1) for LCM circuit 316(1) adds every four (4) iterations. If there was no reserved allocation for LCM circuit 316(1), then its current allocation would have reached 2.5 after (2.5*4)/0.5=20 iterations. Since there is a reserved current allocation of 2.5 amp for LCM circuit 316(1), its adder circuit 702(1) should not add epsilon 704 until iteration twenty (20), and start adding epsilon 704 to the initiated 2.5 amp after the 20$^{th}$ iteration. In general, the start time for an adder circuit 702(0)-702(N) associated with an LCM circuit 316(0)-316(N) with weight X and absolute reserved allocation limit of Y can be calculated as follows:

Start time=(Y*maximum weight)/(X*Epsilon)

The number of iterations that it takes to calculate current allocations based on this method does not increase with maximum rail current or number of CPUs 310(0)-310(N). The maximum iteration is bounded by the following:

maximum current demand*maximum weight/epsilon.

For example, if the maximum weight is ten (10), maximum demand across all the LCM circuits 316(0)-316(N) is four (4) amps, and epsilon 704 is 0.1, then this method finishes in maximum 400 iterations.

As discussed above, current can be allocated to the CPUs 310(0)-310(N) in the multi-CPU processor 302 in FIG. 3 based on constraining current consumption to the maximum rail current limit of the power rail 308. However, the technique described above for allocation of current to the CPUs 310(0)-310(N) can also be based on other constraints. For example, it may be desired to constrain current allocation to the CPUs 310(0)-310(N) based on a current limit that is less than the maximum rail current limit of the power rail 308. For example, current margin is desired between the maximum rail current limit and the maximum current allocated to the CPUs 310(0)-310(N). Current could also be allocated to the CPUs 310(0)-310(N) to meet other current-based constraints, such as power consumption and/or thermal constraints. For example, a current limit could be provided that is based on constraining power consumption and/or thermal considerations used by the power management system 306 to constrain current, and allocate current to the CPUs 310(0)-310(N) if the current limit would be exceeded based on current demand from the CPUs 310(0)-310(N).

For example, consider the case where it is desired to limit the power consumption of the IC chip 304 within a certain maximum power limit. A current constraint can be derived that is based on the desired maximum power limit. Instead of having to reduce the regulated voltage $V_R$ of the power rail 308, thus lowering power to all CPUs 310(0)-310(N) if the power limit would otherwise be exceeded, the techniques described above can be employed to allocate current to the CPUs 310(0)-310(N) such that the overall power limit is not exceeded while each CPU 310(0)-310(N) is allocated a current according to its performance criteria. For example, assume the actual physical current limit of the power rail 308 is 100 Amps (A), but the power limit would be exceeded for a current of 50 A on the power rail 308. The maximum current allocation can thus be set to 50 A. This will cause the GCM circuit 312 to start restricting current allocation requests by the LCM circuits 316(0)-316(N) when the total current allocation is 50 A to limit the maximum total current on the power rail 308 to 50 A, thus limiting the power to the desired power limit based on a 50 A power rail 308 current. The same is true for thermal constraints. A thermal constraint can be correlated to a current limit on the power rail 308, which can then be used in turn by the GCM circuit 312 to start restricting current allocation requests by the LCM circuits 316(0)-316(N). Thus, the same power management system 306 described above can be used to implement any of these and other current constraints, power constraints, and/or thermal constraints.

Power management systems and methods that can allocate power between multiple CPUs in a multi-CPU processor based on total current availability and individual CPU QoS requirements, and according to any aspects disclosed herein, may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 8:
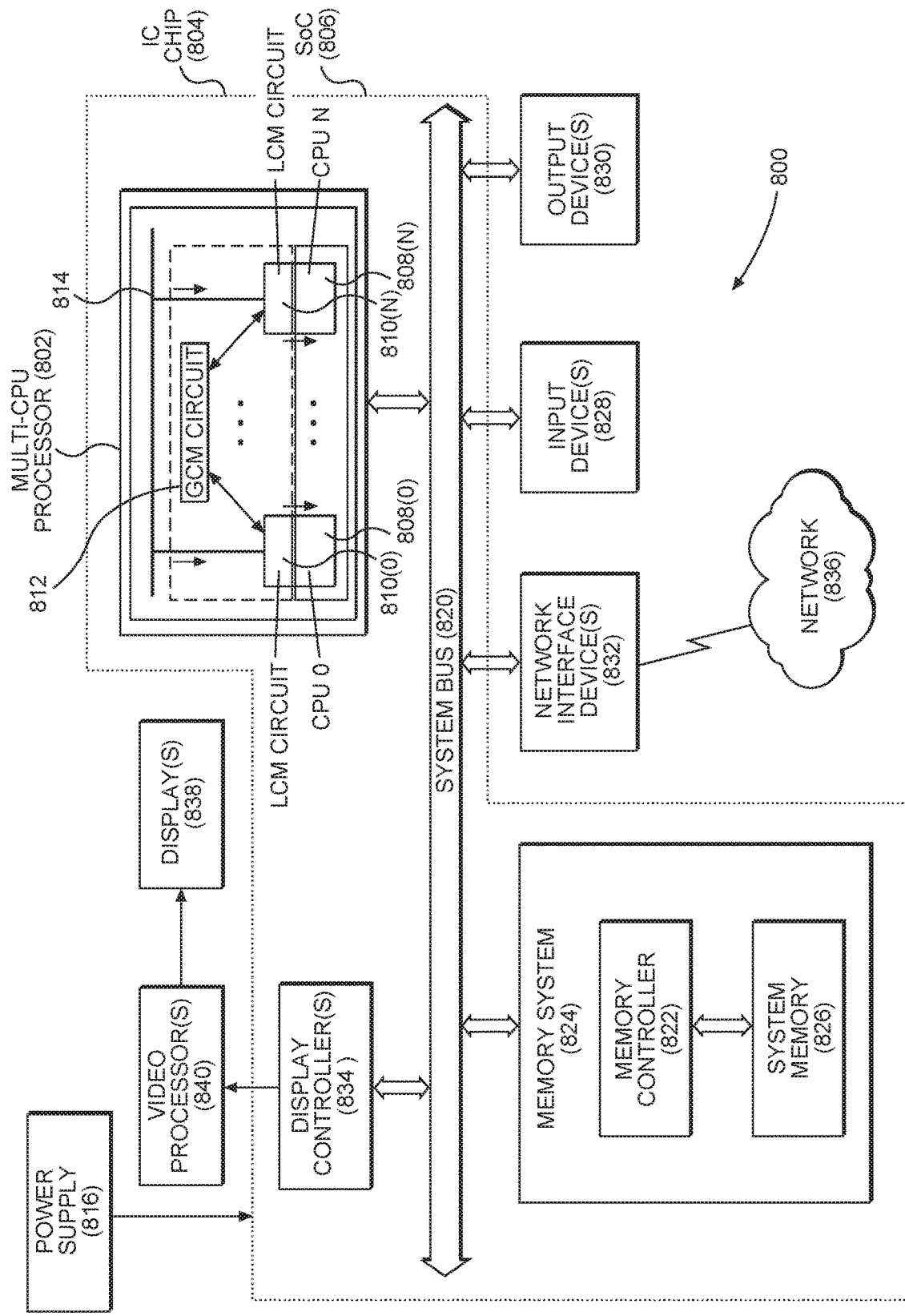
FIG. 8 is a block diagram of an exemplary processor-based system that can include an IC chip with a multi-CPU processor, such as the multi-CPU processor in FIG. 3, and a power management system configured to allocate power between multiple CPUs in a multi-CPU processor based on total current availability and individual CPU QoS requirements, including according to any of the exemplary aspects disclosed herein.

In this regard, FIG. 8 illustrates an example of a processor-based system 800 that includes a multi-CPU processor 802 that may be provided in an IC chip 804, which may be a system-on-a-chip (SoC) 806. The multi-CPU processor 802 includes multiple CPUs 808(0)-808(N). The CPUs 808(0)-808(N) are each configured to execute software processes and tasks. LCM circuits 810(0)-810(N) are located in the IC chip 804 and associated with each CPU 808(0)-808(N), similar to the multi-CPU processor 302 in FIGS. 3 and 4. The processor-based system 800 is configured to receive power for operation from a power supply 816. A power rail (not shown) in the multi-CPU processor 802 is electrically coupled to the power supply 816 to receive power for operation of the multi-CPU processor 802.

The CPUs 808(0)-808(N) are coupled to a system bus 820 and can intercouple peripheral devices included in the processor-based system 800. Although not illustrated in FIG. 8, multiple system buses 820 could be provided, wherein each system bus 820 constitutes a different fabric. As is well known, the CPUs 808(0)-808(N) communicates with other devices by exchanging address, control, and data information over the system bus 820. For example, the CPUs 808(0)-808(N) can communicate bus transaction requests to a memory controller 822 in a memory system 824 as an example of a slave device. In this example, the memory controller 822 is configured to provide memory access requests to system memory 826.

Other devices can be connected to the system bus 820. As illustrated in FIG. 8, these devices can include the memory system 824, one or more input devices 828, one or more output devices 830, one or more network interface devices 832, and one or more display controllers 834, as examples. The input device(s) 828 can include any type of input device, including but not limited to input keys, switches, voice processors, etc. The output device(s) 830 can include any type of output device, including but not limited to audio, video, other visual indicators, etc. The network interface device(s) 832 can be any devices configured to allow exchange of data to and from a network 836. The network 836 can be any type of network, including but not limited to a wired or wireless network, a private or public network, a local area network (LAN), a wireless local area network (WLAN), a wide area network (WAN), a BLUETOOTH™ network, and the Internet. The network interface device(s) 832 can be configured to support any type of communications protocol desired.

The CPUs 808(0)-808(N) may also be configured to access the display controller(s) 834 over the system bus 820 to control information sent to one or more displays 838. The display controller(s) 834 sends information to the display(s) 838 to be displayed via one or more video processors 840, which process the information to be displayed into a format suitable for the display(s) 838. The display(s) 838 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A power management system for a multiple (multi-) central processing unit (CPU) processor, comprising:
   a plurality of local current manager (LCM) circuits each associated with a CPU among a plurality of CPUs, each LCM circuit among the plurality of LCM circuits communicatively coupled to a global current manager (GCM) circuit;
   the GCM circuit configured to:
      receive a current allocation request from a LCM circuit among the plurality of LCM circuits indicating a requested current allocation for its respective CPU;
      determine if the requested current allocation from the LCM circuit would cause a total current allocation for the plurality of CPUs to exceed a maximum rail current limit for a power rail configured to supply power to the plurality of CPUs; and
      in response to determining that the requested current allocation from the LCM circuit would cause the total current allocation for the plurality of CPUs to exceed the maximum rail current limit for the power rail:
         allocate a current allocation of the total current allocation of the power rail for each of the plurality of CPUs based on a respective performance criteria for each of the plurality of CPUs; and
         communicate the determined current allocation for each of the plurality of CPUs to the plurality of LCM circuits;
   each LCM circuit among the plurality of LCM circuits configured to:
      receive, from the GCM circuit, the current allocation for its associated CPU set by the GCM circuit; and
      determine if a workload performance of its associated CPU among the plurality of CPUs would exceed the current allocation for its associated CPU among the plurality of CPUs set by the GCM circuit; and
      in response to determining the workload performance of its associated CPU among the plurality of CPUs would exceed the current allocation for its associated CPU among the plurality of CPUs set by the GCM circuit:
         reduce an operating frequency of its associated CPU; and
         communicate the current allocation request for additional current allocation for its associated CPU to the GCM circuit.

2. The power management system of claim 1, wherein in response to determining that the requested current allocation from the LCM circuit would cause the total current allocation for the plurality of CPUs to exceed the maximum rail current limit for the power rail, the GCM circuit is configured to:
   proportionally allocate the current allocation of the total current allocation of the power rail for each of the plurality of CPUs based on the respective performance criteria of each of the plurality of CPUs.

3. The power management system of claim 2, wherein each LCM circuit among the plurality of LCM circuits is configured to communicate the respective performance criteria for its associated CPU among the plurality of CPUs to the CGM circuit.

4. The power management system of claim 1, wherein the GCM circuit is further configured to set the current allocation for each CPU among the plurality of CPUs based on the respective performance criteria for each of the plurality of CPUs.

5. The power management system of claim 1, wherein:
   the GCM circuit is further configured to, in response to determining that the requested current allocation from the LCM circuit would cause the total current allocation for the plurality of CPUs to exceed the maximum rail current limit for the power rail, communicate a denial of the requested current allocation from the LCM circuit; and
   each LCM circuit among the plurality of LCM circuits is further configured to, in response to receiving a denial from the GCM circuit for the additional current allocation required for its associated CPU:
      receive, from the GCM circuit, a new current allocation for its associated CPU; and
      adjust an operating frequency of the associated CPU based on the received new current allocation.

6. The power management system of claim 5, wherein each LCM circuit among the plurality of LCM circuits is further configured to, in response to receiving the denial from the GCM circuit for the additional current allocation required for its associated CPU, instruct a voltage regulator circuit to adjust an operating voltage of the associated CPU based on the adjusted operating frequency.

7. The power management system of claim 1, wherein each LCM circuit among the plurality of LCM circuits is further configured to:
monitor current consumption of its associated CPU among the plurality of CPUs;
determine if the monitored current consumption of its associated CPU among the plurality of CPUs would exceed the current allocation for its associated CPU among the plurality of CPUs set by the GCM circuit; and
in response to determining the monitored current consumption of its associated CPU among the plurality of CPUs would exceed the current allocation for its associated CPU among the plurality of CPUs set by the GCM circuit, reduce the operating frequency of its associated CPU.

8. The power management system of claim 7, wherein each LCM circuit among the plurality of LCM circuits is further configured to, in response to determining the monitored current consumption of its associated CPU among the plurality of CPUs would exceed the current allocation for its associated CPU, communicate the current allocation request for additional current allocation for its associated CPU among the plurality of CPUs to the GCM circuit.

9. The power management system of claim 1, wherein the GCM circuit is further configured to:
set an initial current allocation for each CPU among the plurality of CPUs; and
communicate an initial regulated voltage level to a voltage regulator circuit to set an initial regulated voltage on the power rail based on the initial current allocation for each CPU among the plurality of CPUs.

10. The power management system of claim 9, wherein the GCM circuit is configured to set the initial current allocation for each CPU among the plurality of CPUs based on a minimum and maximum current allocation range.

11. The power management system of claim 9, wherein the GCM circuit is configured to communicate the initial regulated voltage level to the voltage regulator circuit based on a highest operating voltage for a CPU among the plurality of CPUs, to control the initial regulated voltage on the power rail based on the initial current allocation for each CPU among the plurality of CPUs.

12. The power management system of claim 9, wherein:
each LCM circuit among the plurality of LCM circuits is further configured to communicate an initial current allocation request for current allocation for its associated CPU among the plurality of CPUs to the GCM circuit; and
the GCM circuit is configured to set the initial current allocation for each CPU among the plurality of CPUs based on the received initial current allocation request from the plurality of CPUs.

13. The power management system of claim 12, wherein:
each LCM circuit among the plurality of LCM circuits is further configured to communicate initial performance criteria for its associated CPU among the plurality of CPUs to the GCM circuit; and
the GCM circuit is configured to determine the initial current allocation for each CPU among the plurality of CPUs based on the initial performance criteria received from each LCM circuit among the plurality of LCM circuits.

14. The power management system of claim 1, wherein the GCM circuit is configured to proportionally allocate the current allocation of the total current allocation of the power rail for each of the plurality of CPUs based on the respective performance criteria of each of the plurality of CPUs, based on a respective weighting of the plurality of CPUs.

15. The power management system of claim 1, wherein the GCM circuit is configured to:
determine if the current allocation of the total current allocation of the power rail for each of the plurality of CPUs based on the respective performance criteria of each of the plurality of CPUs is less than a minimum current allocation for each of the plurality of CPUs; and
in response to determining the current allocation for a CPU among the plurality of CPUs based on the respective performance criteria is less than the minimum current allocation for such CPU, allocate the minimum current allocation of the total current allocation of the power rail to such CPU.

16. The power management system of claim 1, wherein the GCM circuit is configured to:
determine if the current allocation of the total current allocation of the power rail for each of the plurality of CPUs based on the respective performance criteria of each of the plurality of CPUs exceeds a maximum current allocation for each of the plurality of CPUs; and
in response to determining the current allocation for a CPU among the plurality of CPUs based on the respective performance criteria exceeds the minimum current allocation for such CPU, reallocate the maximum current allocation of the total current allocation of the power rail to such CPU.

17. The power management system of claim 1, wherein each LCM circuit among the plurality of LCM circuits is further configured to determine the current allocation request of the LCM circuit based on a previous reduction in the operating frequency of its associated CPU among the plurality of CPUs.

18. The power management system of claim 17, wherein each LCM circuit among the plurality of LCM circuits is configured to determine the current allocation request of the LCM circuit based on the previous reduction in the operating frequency of its associated CPU among the plurality of CPUs, and to restore the operating frequency of its associated CPU among the plurality of CPUs to the previous operating frequency prior to a previous reduction in the operating frequency.

19. The power management system of claim 1, further comprising:
the power rail configured to receive power from a power supply; and
the plurality of CPUs configured to receive power from the power rail.

20. The power management system of claim 1 integrated into a system-on-a-chip (SoC).

21. The power management system of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer;

a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

22. A method of allocating power from a power rail to a plurality of central processing units (CPUs) in a multiple (multi-) CPU processor, comprising:
   determining in a local current manager (LCM) circuit among a plurality of LCM circuits if a workload performance of its associated CPU among a plurality of CPUs would exceed a current allocation for its associated CPU by a global current manager (GCM) circuit coupled to each of the plurality of LCM circuits;
   in response to determining the workload performance of its associated CPU would exceed the current allocation for its associated CPU:
      reducing an operating frequency of the associated CPU; and
      communicating a current allocation request for additional current allocation for the associated CPU to a GCM circuit;
   receiving the current allocation request from the LCM circuit among the plurality of LCM circuits in the GCM circuit indicating the requested current allocation for its associated CPUs among a plurality of CPUs;
   determining if the requested current allocation would cause a total current allocation for the plurality of CPUs to exceed a maximum rail current limit for a power rail configured to provide power to the plurality of CPUs; and
   in response to determining that the requested current allocation would cause the total current allocation for the plurality of CPUs to exceed the maximum rail current limit for the power rail:
      allocating a current allocation of the total current allocation of the power rail for each of the plurality of CPUs based on the respective performance criteria for each of the plurality of CPUs;
      communicating the determined current allocation for each of the plurality of CPUs to the plurality of LCM circuits; and
      setting an operating frequency of the plurality of CPUs based on the determined current allocation for each of the plurality of CPUs.

23. The method of claim 22, wherein in response to determining that the requested current allocation from the LCM circuit would cause the total current allocation for the plurality of CPUs to exceed the maximum rail current limit for the power rail,
   proportionally allocating the current allocation of the total current allocation of the power rail for each of the plurality of CPUs based on a respective performance criteria of each of the plurality of CPUs.

24. The method of claim 22, wherein:
   in response to determining that the requested current allocation from the LCM circuit would cause the total current allocation for the plurality of CPUs to exceed the maximum rail current limit for the power rail:
      communicating a denial of the requested current allocation from the LCM circuit, to the LCM circuit;
      sending a new current allocation to the LCM circuit for its associated CPU among the plurality of CPUs; and
      adjusting the operating frequency of the associated CPU among the plurality of CPUs based on the new current allocation.

25. The method of claim 24, wherein, in response to receiving the denial from the LCM circuit for the additional current allocation required for its associated CPU, further comprising instructing a voltage regulator circuit to adjust an operating voltage of the associated CPU based on the adjusted operating frequency.

26. The method of claim 23, further comprising:
   monitoring current consumption of its associated CPU among the plurality of CPUs;
   determining if the monitored current consumption of its associated CPU among the plurality of CPUs would exceed the current allocation for its associated CPU set by the GCM circuit; and
   in response to determining the monitored current consumption of its associated CPU among the plurality of CPUs would exceed the current allocation for its associated CPU, reducing the operating frequency of its associated CPU.

* * * * *